(12) United States Patent
Kotecha (10) Patent No.: US 9,001,657 B2
(45) Date of Patent: Apr. 7, 2015

(54) MESH NETWORK NODE WITH MULTIPLE AUTOMATIC REPEAT REQUESTERS

(75) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 400 days.

(21) Appl. No.: 13/532,398

(22) Filed: Jun. 25, 2012

(65) Prior Publication Data

US 2013/0343192 A1   Dec. 26, 2013

(51) Int. Cl.
*H04L 12/26* (2006.01)
*H04L 1/18* (2006.01)
*H04L 12/851* (2013.01)

(52) U.S. Cl.
CPC .. *H04L 1/18* (2013.01); *H04L 47/24* (2013.01)

(58) Field of Classification Search
USPC .................................. 370/235, 328; 714/749
See application file for complete search history.

(56) References Cited

U.S. PATENT DOCUMENTS

| | | | |
|---|---|---|---|
| 5,490,168 A * | 2/1996 | Phillips et al. ................. | 375/224 |
| 2003/0210669 A1* | 11/2003 | Vayanos et al. ............... | 370/335 |
| 2003/0231594 A1* | 12/2003 | Xu et al. ........................ | 370/236 |
| 2004/0120284 A1* | 6/2004 | Terry et al. .................... | 370/329 |
| 2006/0092973 A1* | 5/2006 | Petrovic et al. ............... | 370/469 |
| 2006/0258291 A1* | 11/2006 | Nakata et al. ............... | 455/67.11 |
| 2007/0106924 A1* | 5/2007 | Seidel et al. ................... | 714/748 |
| 2008/0010434 A1* | 1/2008 | Jitsukawa et al. ................. | 712/1 |
| 2010/0226316 A1* | 9/2010 | Terry et al. .................... | 370/328 |
| 2011/0273981 A1* | 11/2011 | Ktenas et al. ................. | 370/226 |
| 2012/0039224 A1* | 2/2012 | Terry et al. .................... | 370/310 |

* cited by examiner

*Primary Examiner* — Jeffrey M Rutkowski
*Assistant Examiner* — Jonathan B Wood (57) ABSTRACT

A device may receive a packet, may identify a first packet characteristic associated with the packet, may identify a second packet characteristic associated with the packet, and may store information associated with the packet in a queue based on the first packet characteristic and the second packet characteristic. The device may service the packet from the queue based on an automatic repeat requester ("ARQ") mechanism. The ARQ mechanism may specify a maximum quantity of times that the packet should be serviced before being dropped, when a packet acknowledgement is not received, may specify a time period between packet service attempts, and may be based on the first packet characteristic and the second packet characteristic.

20 Claims, 7 Drawing Sheets

MESH NETWORK NODE WITH MULTIPLE AUTOMATIC REPEAT REQUESTERS

BACKGROUND

A mesh network is a communication network that includes mesh nodes. A mesh node may process traffic associated with devices connected to the mesh node. A mesh node may also act as a relay for other mesh nodes by processing traffic associated with devices connected to the other mesh nodes. Traffic may hop from node to node along a path from a source node to a destination node.

DETAILED DESCRIPTION OF PREFERRED EMBODIMENTS

The following detailed description of example embodiments refers to the accompanying drawings. The same reference numbers in different drawings may identify the same or similar elements.

The term "packet," as used herein, may refer to a packet, a datagram, a cell, a fragment of a packet, a fragment of a datagram, a fragment of a cell, or any other type or arrangement of data that may be carried at a specified communication layer.

Communication networks often operate by dividing communication transmissions into packets and transmitting the packets to a receiver, where the packets may be properly sequenced in order to receive the original transmission. However, a packet transmission may be subject to a packet error, when a packet is not received in its intended form by the intended receiver.

To deal with packet errors, a network node may utilize an automatic repeat requester ("ARQ"). An ARQ may transmit a packet to a receiver, and may receive an acknowledgement, from the receiver, that the packet was received. If the ARQ does not receive an acknowledgement within a specified time period, the ARQ may re-transmit the packet to the receiver. The ARQ may continue to re-transmit the packet until the ARQ receives an acknowledgement from the receiver, or until the ARQ has re-transmitted the packet a specified quantity of times, after which the network node may drop the packet.

Using a single ARQ for every packet handled by a network node may cause unnecessary packet processing inefficiencies. Implementations described herein may process packets more efficiently by using different ARQs for different packets, based on characteristics associated with the packets.

Figure 1:
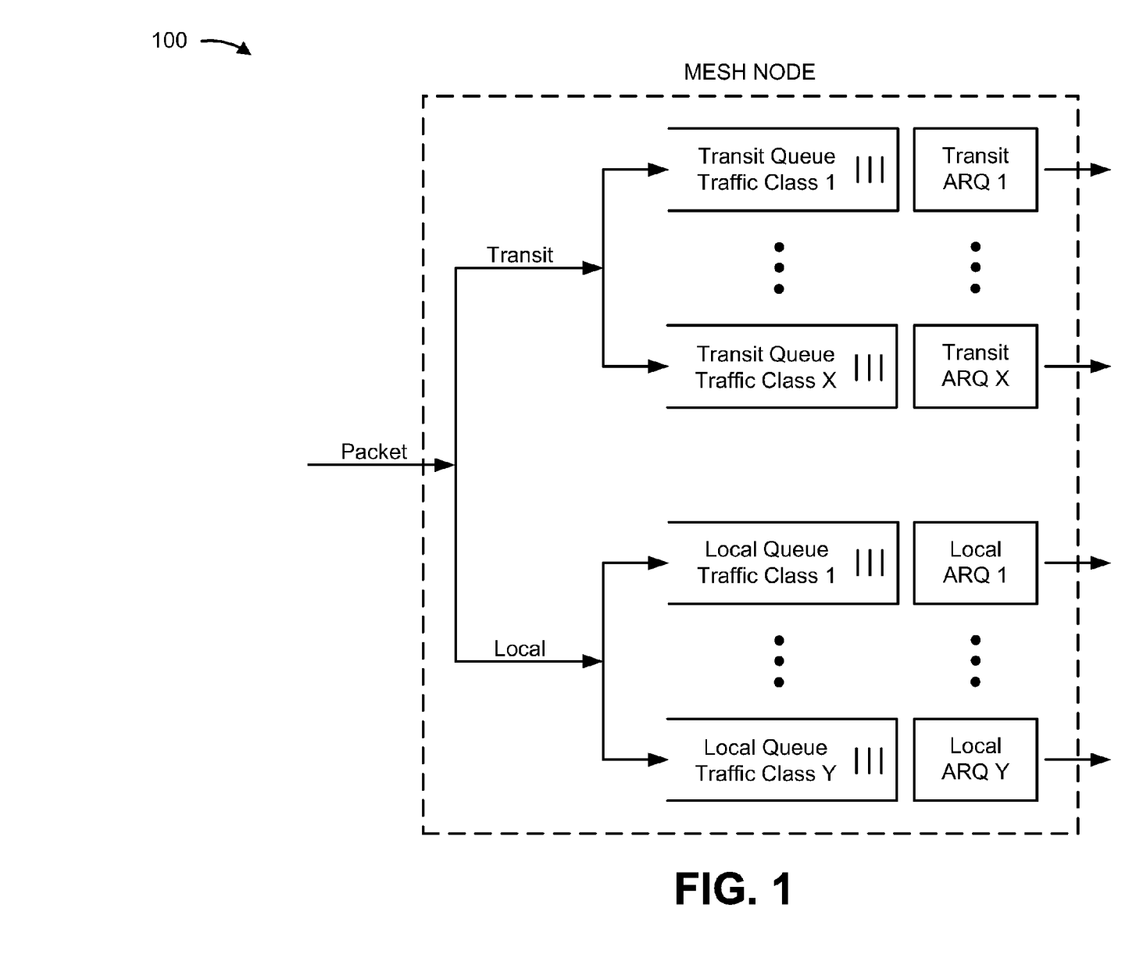
FIG. 1 is a diagram of an overview of an example implementation described herein.

FIG. 1 is a diagram of an overview 100 of an example implementation described herein. As illustrated in FIG. 1, a packet may be received by a network node (e.g., a mesh node). Information associated with the packet may be stored in a queue based on a characteristic associated with the packet. For example, a packet may be associated with local traffic (e.g., traffic received from user devices connected to the mesh node) or transit traffic (e.g., traffic received from another mesh node). Additionally, a packet may be associated with a traffic class.

A packet may be queued based on a traffic class associated with the packet, and based on whether the packet is associated with local traffic or transit traffic, as illustrated. Each queue may utilize a different ARQ to deal with potential packet errors experienced during packet transmission. Each ARQ may use a different algorithm to process packets. For example, each ARQ may use a different quantity of transmission attempts or a different timer value when processing packets.

Figure 2:
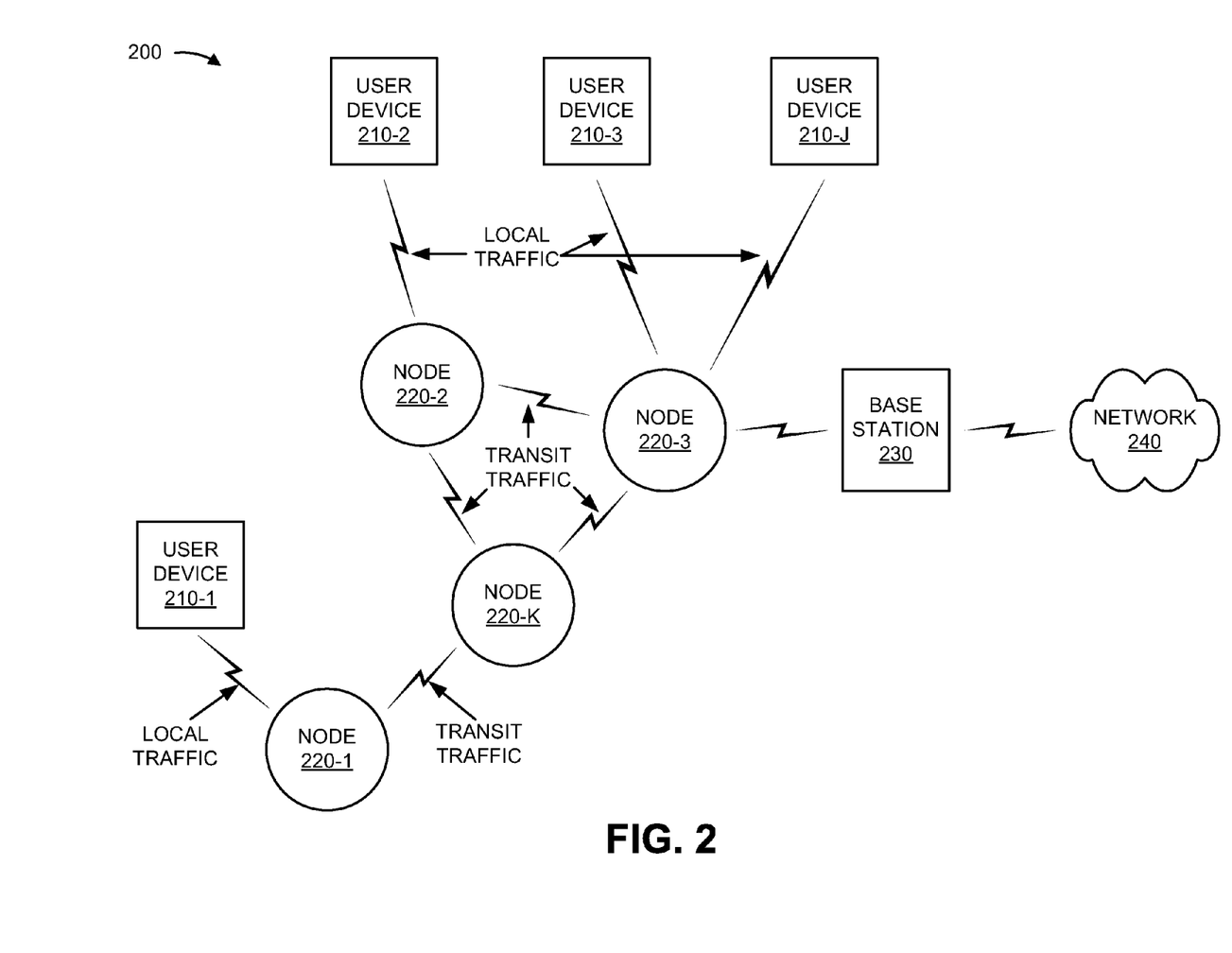
FIG. 2 is a diagram of an example environment in which systems and/or methods described herein may be implemented.

FIG. 2 is a diagram of an example environment 200 in which systems and/or methods described herein may be implemented. Environment 200 may include a set of user devices 210-1 through 210-J (J≥1) (hereinafter referred to collectively as "user devices 210," and individually as "user device 210"), a set of nodes 220-1 through 220-K (K≥1) (hereinafter referred to collectively as "nodes 220," and individually as "node 220"), a base station 230, and a network 240. Local traffic may be communicated between a user device 210 and a node 220. Transit traffic may be communicated between one node 220 and another node 220.

The number of devices and/or networks illustrated in FIG. 2 is provided for explanatory purposes. In practice, there may be additional devices and/or networks, fewer devices and/or networks, different devices and/or networks, or differently arranged devices and/or networks than are shown in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

User device 210 may include any computation and communication device, such as a wireless mobile communication device, that is capable of communicating with node 220, base station 230, and/or network 240. For example, user device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, a set-top box, a television, a camera, a gaming system, a mobile code reader, an energy use monitor, and/or another type of computation and communication device.

Node 220 may include one or more computation and communication devices that gather, process, store, and/or provide information in a manner described herein. Node 220 may include one or more data processing and/or traffic transfer devices, such as a wireless radio node, a mesh node, a router, a gateway, a hub, a switch, a bridge, a computer (e.g., a server), a modem, a firewall, a network interface card, an optical add-drop multiplexer, and/or another type of device capable of processing and/or transferring traffic (e.g., packets). In some implementations, node 220 may include a mesh node capable of processing and/or transferring traffic received from user device 210 and/or another node 220. Traffic communicated between a user device 210 and a node 220 may be referred to herein as "local traffic." Traffic communicated between two nodes 220 may be referred to herein as "transit traffic." Node 220 may be capable of transmitting traffic to and/or receiving traffic from base station 230.

Base station 230 may include one or more devices that receive, process, and/or transmit traffic, such as audio, video, text, data and/or other traffic, transmitted to and/or received from user device 210 and/or node 220. In some implementations, base station 230 may include an eNodeB ("eNB"), associated with a long term evolution ("LTE") network, that receives traffic from and/or sends traffic to network 240. Additionally, or alternatively, base station 230 may be associated with a radio access network that is not associated with an LTE network. Base station 230 may send traffic to and/or receive traffic from user device 210 and/or node 220 via an air interface. In some implementations, base station 230 may be a small cell, such as a microcell, a picocell, and/or a femtocell. Additionally, or alternatively, multiple spatially separated radiating elements may be connected to a common base station 230, for example, using a distributed antenna system (DAS).

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, a fiber optic-based network (e.g., "FiOS"), and/or a combination of these or other types of networks.

Figure 3:
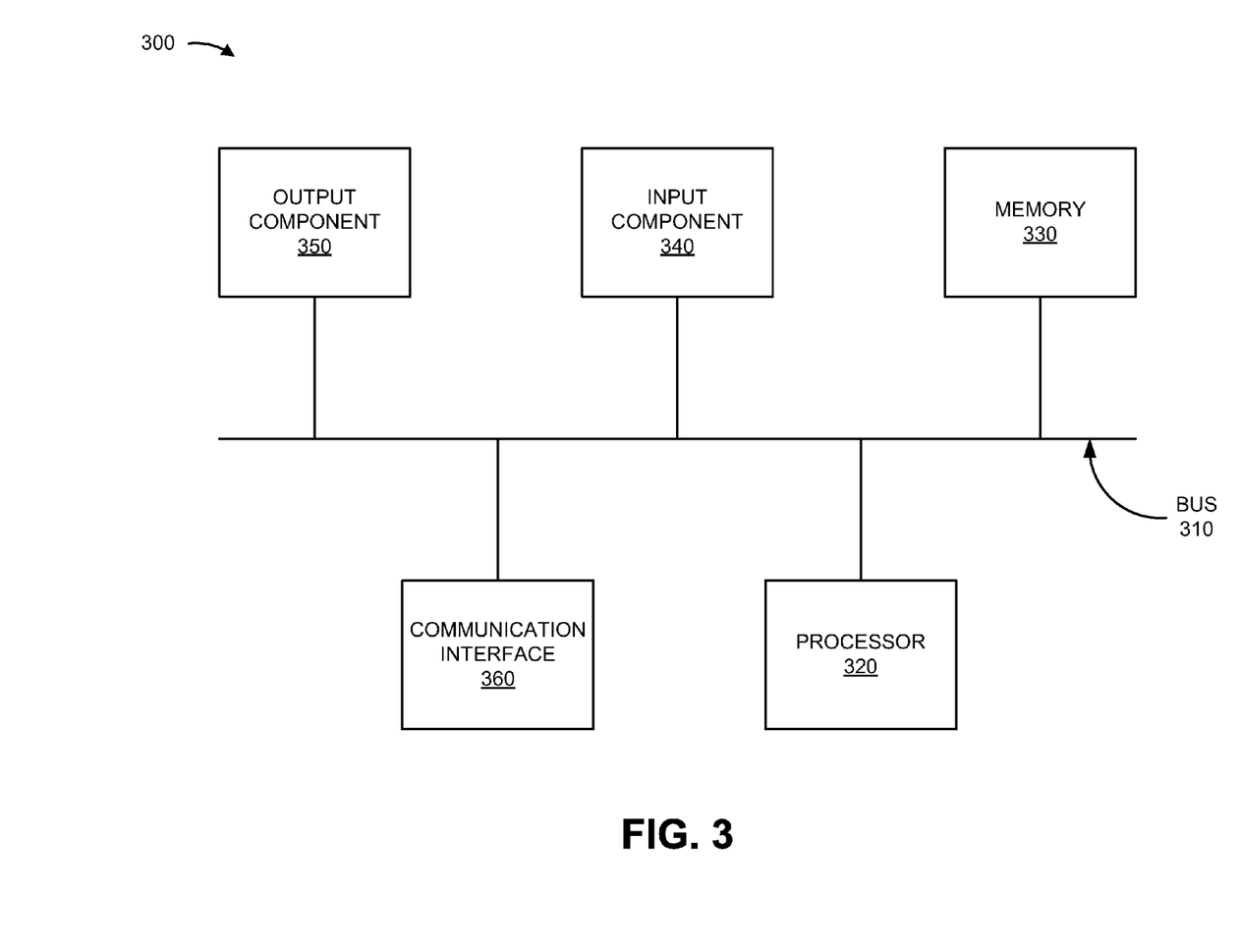
FIG. 3 is a diagram of example components of one or more devices of FIG. 2.

FIG. 3 is a diagram of example components of a device 300. Device 300 may correspond to user device 210, node 220, and/or base station 230. Additionally, or alternatively, each of user device 210, node 220, and/or base station 230 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than those illustrated in FIG. 3.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and executes instructions. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include mechanisms for communicating with another device and/or system via a network, such as network 240. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Figure 4:
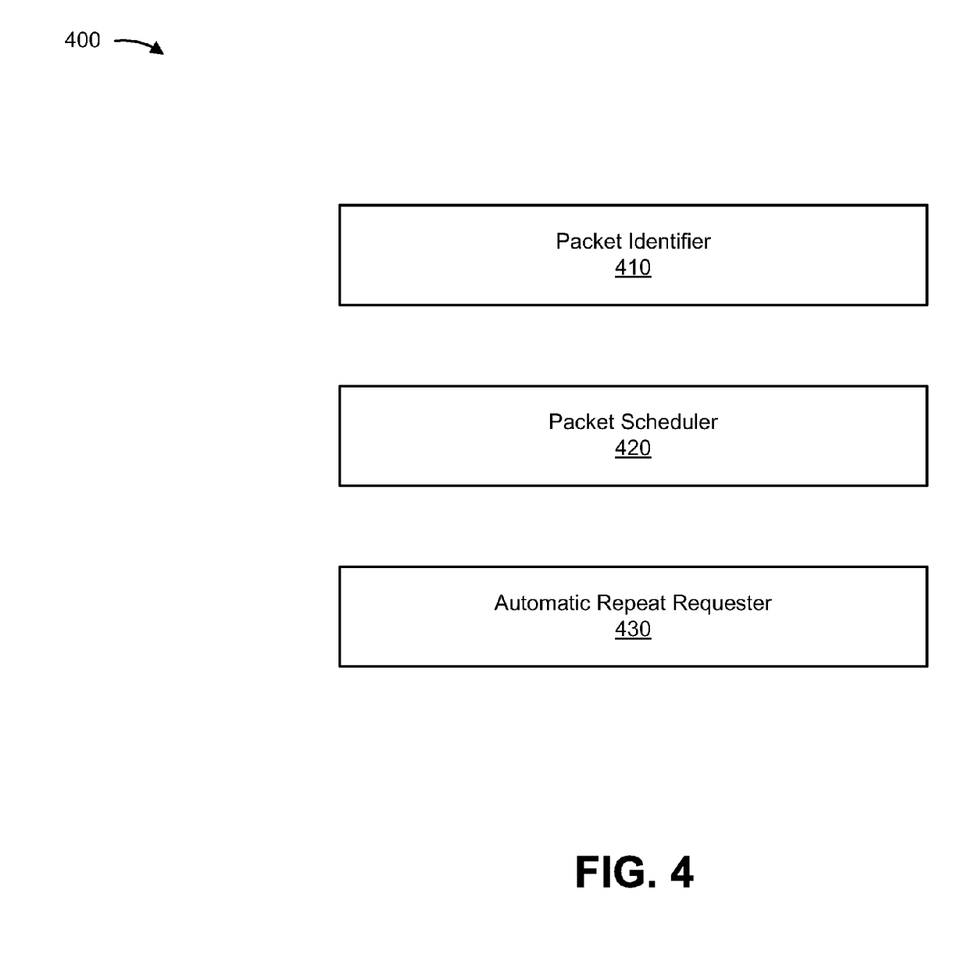
FIG. 4 is a diagram of example functional components of one or more devices of FIG. 2.

FIG. 4 is a diagram of example functional components of a device 400 that may correspond to node 220 and/or base station 230. Device 400 may include a packet identifier 410, a packet scheduler 420, and an automatic repeat requester ("ARQ") 430. Each of functional components 410-430 may be implemented using one or more devices 300 or one or more components of device 300. Node 220 and/or base station 230 may individually include all of the functional components depicted in FIG. 4, or the functional components depicted in FIG. 4 may be distributed singularly or duplicatively in any manner between the devices illustrated in FIG. 2. In some implementations, node 220 and/or base station 230 may include other functional components (not shown) that aid in transferring traffic to and/or from user devices 210 and/or nodes 220.

Packet identifier 410 may perform operations associated with identifying a characteristic of a packet. In some implementations, packet identifier 410 may receive a packet (e.g., at node 220), and may determine a characteristic of a packet based on information stored in a packet header. Additionally, or alternatively, packet identifier 410 may identify a packet characteristic associated with a packet, and may embed information that identifies the packet characteristic in the packet and/or attach, to the packet, information that identifies the packet characteristic. For example, packet identifier 410 may embed information that identifies the packet characteristic in a field in a packet header, such as in a differentiated services code point ("DSCP") field, or may append, to the packet, information that identifies the packet characteristic.

In some implementations, a packet characteristic may include a packet source identifier. A packet source identifier may identify a packet source (e.g., a local source, a transit source, a particular source device, a particular source node, etc.). A packet may be associated with a local source if the packet is received by node 220 from user device 210 without being relayed via another node 220 (e.g., an intermediate node). A packet may be associated with a transit source if the packet is received by node 220 from another node 220.

Additionally, or alternatively, a packet characteristic may include a packet destination identifier. A packet destination identifier may identify a packet destination (e.g., a local destination, a transit destination, a particular destination device, a particular destination node, etc.). A packet may be associated with a local destination if the packet is transmitted by node 220 to user device 210 without being relayed to another node 220 (e.g., an intermediate node). A packet may be associated with a transit destination if the packet is transmitted by node 220 to another node 220.

Additionally, or alternatively, a packet characteristic may include an application type associated with the packet (e.g., conversational voice, voice over internet protocol ("VoIP") conversational video, interactive video, streaming video, real-time gaming, web, e-mail, etc.); an application associated with the packet (e.g., a particular mobile application); a priority of the packet (e.g., a relative priority compared to other packets); whether the packet is associated with a guaranteed bit rate service or a non-guaranteed bit rate service; a protocol associated with a packet (e.g., connectionless protocol, connection-oriented protocol, etc.); and/or a quality of service ("QoS") characteristic associated with the packet, such as a specified error characteristic associated with the packet (e.g., a specified transmission delay and/or latency associated with the packet, a specified packet error loss rate associated with the packet, a specified jitter and/or packet delay variation associated with the packet, a specified data integrity associated with the packet, etc.).

In some implementations, a packet characteristic may include a quality of service class identifier ("QCI") class associated with a packet. A QCI class may be identified by a QCI value of 1 through 9, with QCI values 1 through 4 identifying guaranteed bit rate services, and QCI values 5 through 9 identifying non-guaranteed bit rate services. QCI value 1 may identify a packet associated with conversational voice communications. QCI value 2 may identify a packet associated with conversational video communications. QCI value 3 may identify a packet associated with real-time gaming communications. QCI value 4 may identify a packet associated with streaming video communications. QCI value 5 may identify a packet associated with IMS signaling communications. QCI values 6, 8, and 9 may identify a packet associated with streaming video, web browsing, and/or e-mail communications. QCI value 7 may identify a packet associated with voice, video, and/or gaming communications.

Packet identifier 410 may classify a packet into a traffic class based on one or more packet characteristics associated with the packet. Additionally, or alternatively, packet identifier 410 may apply different weights to different packet characteristics, and may classify the packet into a traffic class based on the weighted packet characteristics.

Packet scheduler 420 may perform operations associated with queuing, scheduling, and/or servicing a packet. Packet scheduler 420 may receive information that identifies a characteristic and/or a traffic class associated with a packet (e.g., from packet identifier 410), and may store a packet and/or information associated with a packet (e.g., information that identifies a packet) in a queue based on the received information. For example, packet scheduler 420 may store a packet and/or information associated with a packet in a queue based on a packet source associated with the packet, a packet destination associated with the packet, and/or a traffic class associated with the packet.

Packet scheduler 420 may prioritize and/or service a packet based on a queue (e.g., a packet source queue, a packet destination queue, a traffic class queue, etc.) associated with the packet. For example, packet scheduler 420 may service a set of queues based on a specified order, sequence, priority, bandwidth, and/or work scheduling algorithm (e.g., fair queuing, weighted fair queuing, first-in first-out, round-robin, weighted round-robin, etc.).

In some implementations, packet scheduler 420 may represent multiple packet schedulers. The multiple packet schedulers may service different sets of queues. Additionally, or alternatively, packet scheduler 420 may service different sets of queues and/or different sets of packets (e.g., packets associated with different packet characteristics) using different orders, sequences, priorities, bandwidths, and/or work scheduling algorithms.

As used herein, "servicing" a packet and/or a queue may refer to reading a packet and/or information associated with the packet from a queue, identifying a packet characteristic and/or a traffic class associated with the packet (e.g., using packet identifier 410), and placing the packet and/or information associated with the packet in another queue based on the identified packet characteristic and/or traffic class. Additionally, or alternatively, "servicing" a packet may refer to transmitting the packet and/or information associated with the packet to a device (e.g., user device 210 and/or node 220).

Automatic repeat requester ("ARQ") 430 may perform operations associated with transmitting and/or re-transmitting packets based on an ARQ algorithm. ARQ 430 may transmit a packet to a receiver (e.g., user device 210 and/or node 220), and may receive an acknowledgement, from the receiver, that the packet was received. If ARQ 430 does not receive an acknowledgement within a specified time period (e.g., based on an ARQ algorithm), ARQ 430 may re-transmit the packet to the receiver. ARQ 430 may continue to re-transmit the packet until ARQ 430 receives an acknowledgement from the receiver, or until ARQ 430 has re-transmitted the packet a specified quantity of times (e.g., based on an ARQ algorithm), after which ARQ 430 and/or node 220 may drop the packet.

ARQ 430 may use an ARQ algorithm as a mechanism to determine how packets are to be re-transmitted. In some implementations, an ARQ algorithm may specify a time period between a packet transmission by ARQ 430 and a packet re-transmission by ARQ 430. If ARQ 430 does not receive an acknowledgement of packet reception during the specified time period (e.g., after a packet transmission), then ARQ 430 may re-transmit the packet. Additionally, or alternatively, an ARQ algorithm may specify a maximum quantity of re-transmission attempts. If ARQ 430 has re-transmitted a packet the maximum quantity of specified times, and ARQ 430 has not received an acknowledgement of packet reception, then ARQ 430 and/or node 220 may drop the packet (e.g., may remove the packet from a queue and/or may stop attempting to transmit the packet).

In some implementations, ARQ 430 may represent multiple ARQs. The multiple ARQs may service different sets of queues. Additionally, or alternatively, ARQ 430 may apply different ARQ algorithms (e.g., stop-and-wait ARQ, go-back-N ARQ, selective repeat ARQ, etc.) to different sets of queues and/or to different sets of packets (e.g., packets associated with different packet characteristics).

Figure 5:
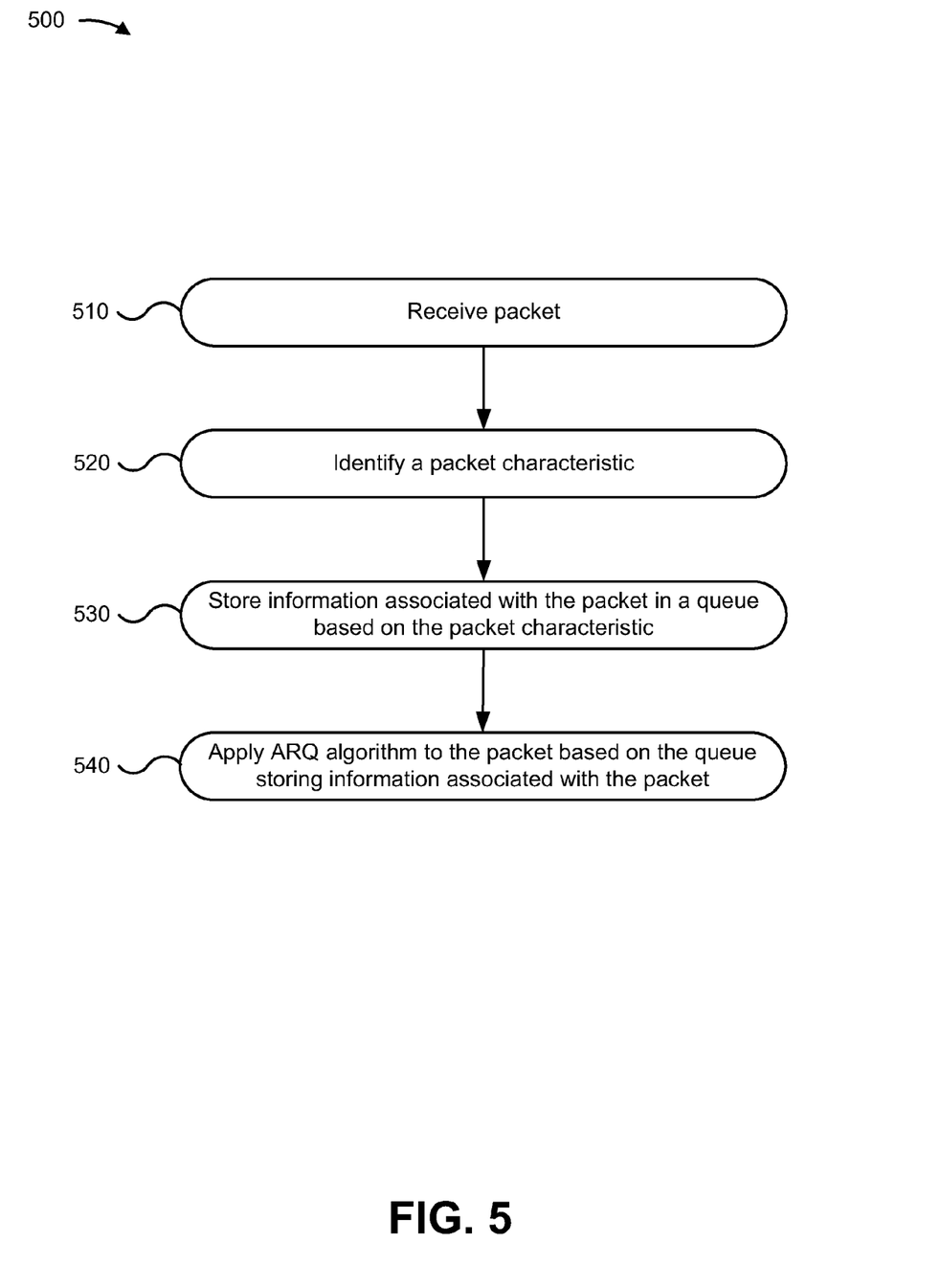
FIG. 5 is a diagram of an example process for processing packets at a node.

FIG. 5 is a diagram of an example process 500 for processing packets at a node. In some implementations, one or more process blocks of FIG. 5 may be performed by one or more components of node 220 and/or base station 230.

As shown in FIG. 5, process 500 may include receiving a packet (block 510). For example, a packet and/or information associated with a packet may be received by packet identifier 410 and/or packet scheduler 420. In some implementations, information associated with a received packet may be stored in an input queue. A packet may be serviced from the input queue (e.g., by packet scheduler 420) based on a packet characteristic and/or a work scheduling algorithm (e.g., first-in first-out).

As further shown in FIG. 5, process 500 may include identifying a packet characteristic (block 520). In some implementations, packet identifier 410 may identify a packet characteristic of a received packet, such as a packet source, a packet destination, and/or another packet characteristic. Packet identifier 410 may classify a packet into a traffic class based on one or more identified packet characteristics.

Returning to FIG. 5, process 500 may include storing information associated with the packet in a queue based on the packet characteristic (block 530). For example, a packet may be identified (e.g., by packet identifier 410) as a local packet. Packet scheduler 420 may store information associated with the packet in a queue associated with local packets. Additionally, or alternatively, a packet may be identified as a local packet with a high priority. Packet scheduler 420 may store information associated with the packet in a queue associated with local high priority packets.

As further shown in FIG. 5, process 500 may include applying an ARQ algorithm to the packet based on the queue storing the information associated with the packet (block 540). For example, each queue, associated with packets having different packet characteristics, may be associated with a different ARQ 430 and/or a different ARQ algorithm. ARQ 430 may apply an ARQ algorithm to the packet based on the queue in which the packet and/or information associated with the packet is stored.

Figure 6:
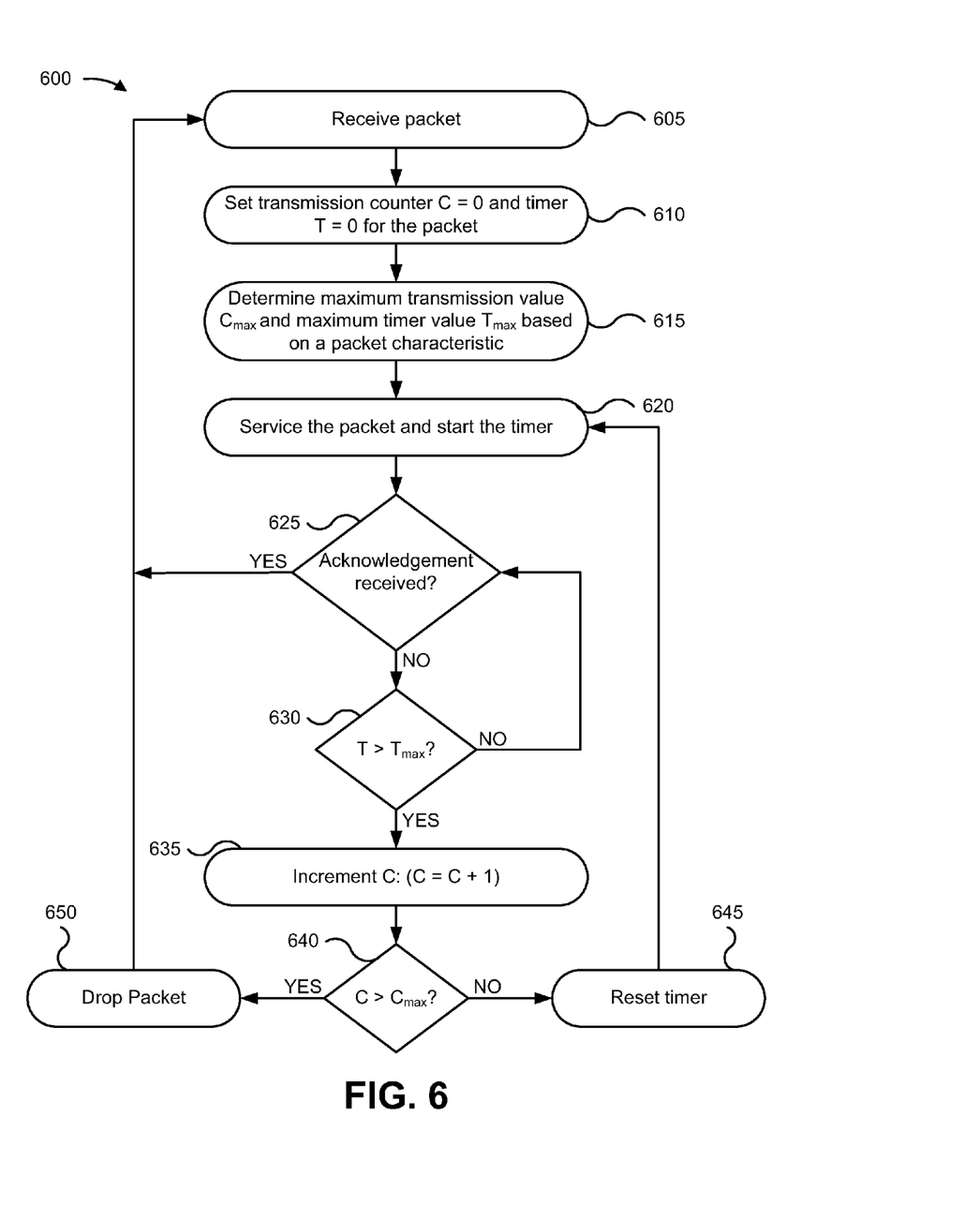
FIG. 6 is a diagram of an example process for applying an automatic repeat request algorithm to a packet.

FIG. 6 is a diagram of an example process 600 for applying an ARQ algorithm to a packet. In some implementations, one or more process blocks of FIG. 6 may be performed by one or more components of node 220 and/or base station 230.

As shown in FIG. 6, process 600 may include receiving a packet (block 605). For example, a packet and/or information associated with a packet may be received by ARQ 430.

As further shown in FIG. 6, process 600 may include setting a transmission counter ("C") and a timer ("T") for the received packet to zero (e.g., C=0, T=0) (block 610). A transmission counter (C) may indicate a quantity of times that ARQ 430 has attempted to transmit a particular packet. As used herein, an attempted transmission may refer to a transmission of a packet, regardless of whether an acknowledgement is received for the packet. An attempted transmission may be an initial transmission and/or a re-transmission. A timer (T) may indicate an amount of time that has passed since ARQ 430 last attempted a transmission and/or a re-transmission. ARQ 430 may initialize the transmission counter (C) and the timer (T) associated with a packet when ARQ 430 initially receives the packet. For example, ARQ 430 may set C=0 and T=0.

As further shown in FIG. 6, process 600 may include determining a maximum transmission value $C_{max}$ and a maximum timer value $T_{max}$ based on a packet characteristic (block 615). For example, ARQ 430 may determine $C_{max}$ and $T_{max}$ based on a queue in which a packet is stored, and/or based on a packet characteristic (e.g., a packet source, a packet destination, a priority, etc.) and/or a traffic class associated with the packet. In some implementations, ARQ 430 may set $C_{max}$ and/or $T_{max}$ to a different value for packets associated with different packet characteristics and/or traffic classes.

In some implementations, packet identifier 410 may classify a packet (e.g., into a traffic class) based on a priority level associated with the packet. For example, a packet may have a high priority or a low priority. ARQ 430 may set $C_{max}$ to a higher value for a high priority packet when compared to a low priority packet. As a result, ARQ 430 may attempt to re-transmit a high priority packet more times than ARQ 430 attempts to re-transmit a low priority packet. Additionally, or alternatively, ARQ 430 may set $T_{max}$ to a lower value for a high priority packet when compared to a low priority packet. As a result, ARQ 430 may attempt to re-transmit a high priority packet more often in a given time period than ARQ 430 attempts to re-transmit a low priority packet in the given time period. ARQ 430 may use any quantity and/or combination of packet characteristics and/or traffic classes associated with a packet in order to determine an ARQ algorithm to apply to the packet.

Returning to FIG. 6, process 600 may include servicing the packet and starting the timer (block 620). In some implementations, packet scheduler 420 and/or ARQ 430 may service the packet. For example, packet scheduler 420 may place the packet in another queue and/or may transmit the packet to a device (e.g., user device 210 and/or node 220). ARQ 430 may start the timer based on servicing the packet. The timer may count a passage of time using any unit (e.g., minutes, seconds, milliseconds, nanoseconds, clock cycles, etc.).

Process 600 may also include determining whether an acknowledgement has been received (block 625). In some implementations, ARQ 430 may determine whether an acknowledgement, associated with a packet transmitted to a device (e.g., user device 210 and/or node 220), has been received from the device. In some implementations, ARQ 430 may continuously monitor and/or listen for an acknowledgement from the device. Alternatively, ARQ 430 may check for an acknowledgement periodically (e.g., with a period less than or equal to $T_{max}$).

If an acknowledgement has been received (block 625-YES), process 600 may return to process block 605, and ARQ 430 may receive another packet (e.g., the next packet in queue).

If an acknowledgement has not been received (block 625-NO), process 600 may determine whether the timer value is greater than the maximum timer value (e.g., $T > T_{max}$) (block 630). In some implementations, the timer may count upward, and ARQ 430 may determine whether the timer value is greater than $T_{max}$. Alternatively, the timer may count downward (e.g., starting at $T_{max}$ and counting down to zero). In either implementation, ARQ 430 may determine whether the amount of time indicated by $T_{max}$ has lapsed (e.g., since the packet was last serviced).

If the amount of time indicated by $T_{max}$ has not expired (block 630-NO), process 600 may return to process block 625, and ARQ 430 may monitor and/or listen for an acknowledgement.

If the amount of time indicated by $T_{max}$ has expired (block 630-YES), process 600 may include incrementing the transmission counter (e.g., C=C+1) (block 635). In some implementations, the transmission counter may start at zero and may be incremented until the transmission counter equals or surpasses $C_{max}$. Alternatively, the transmission counter may start at $C_{max}$ and be decremented until it reaches zero.

As further shown in FIG. 6, process 600 may include determining whether the transmission counter value is greater than the maximum transmission value (e.g., $C > C_{max}$) (block 640). In some implementations, the transmission counter may count upward, and ARQ 430 may determine whether the transmission counter value is greater than $C_{max}$. Alternatively, the transmission counter may count downward (e.g., starting at $C_{max}$ and counting down to zero). In either implementation, ARQ 430 may determine whether the quantity of attempted transmissions is greater than $C_{max}$.

If the quantity of attempted transmissions is not greater than $C_{max}$ (block 640-NO), process 600 may include resetting the timer (block 645) and returning to process block 620. For example, ARQ 430 may reset the timer (e.g., may set T=0) associated with the packet. ARQ 430 may service the packet again (e.g., by transmitting the packet to a queue or to a device), and may start the timer again. This process may be repeated until an acknowledgement is received (block 625-YES), or until the quantity of transmissions attempted by ARQ 430 is greater than $C_{max}$ (block 640-YES).

If the quantity of attempted transmissions is greater than $C_{max}$ (block 640-YES), process 600 may include dropping the packet (block 650), and returning to process block 605. For example, if the quantity of attempted transmissions is greater than $C_{max}$, ARQ 430 and/or packet scheduler 420 may drop the packet (e.g., from a queue and/or from node 220), and ARQ 430 may receive another packet (e.g., the next packet in queue).

In some implementations, information associated with the dropped packet may be stored in memory, and may be used by ARQ 430 to set $C_{max}$ and $T_{max}$ values. For example, a packet characteristic and/or a traffic class associated with dropped packets may be aggregated and stored in memory. The aggregated data may be used to calculate QoS and/or error characteristics (e.g., a packet error loss rate) for packets associated with a particular packet characteristic and/or traffic class. ARQ 430 may compare the QoS and/or error characteristic to a specified threshold to determine whether $C_{max}$ and $T_{max}$ values should be adjusted for packets associated with the particular packet characteristic and/or traffic class.

For example, packets associated with a VoIP application may have a threshold packet error loss rate of 5% (e.g., 5 packets dropped per 100 packets transmitted). If the aggregated data associated with VoIP packets (e.g., at a particular node 220) indicates that the packet error loss rate of VoIP packets is greater than 5%, ARQ 430 may increase the value of $C_{max}$ and/or decrease the value of $T_{max}$ in order to reduce the quantity of dropped VoIP packets.

In some implementations, information associated with dropped packets may be aggregated for a particular node 220. Additionally, or alternatively, information associated with dropped packets may be aggregated across a set of nodes 220 (e.g., nodes 220 associated with a particular characteristic, such as a service area, a traffic volume, an average traffic volume, a node type, a node capability, etc.). ARQ 430 may use information aggregated for a particular node 220 and/or across a set of nodes 220 to set $C_{max}$ and $T_{max}$ values. For example, ARQ 430 may set $C_{max}$ and $T_{max}$ values at a particular node 220 based on information aggregated for the particular node 220. Additionally, or alternatively, ARQ 430 may set $C_{max}$ and $T_{max}$ values for a set of nodes 220 based on information aggregated for the set of nodes 220.

In some implementations, ARQ 430 may transmit multiple packets (e.g., a packet window) rather than sending one packet at a time and waiting to receive an acknowledgement for the one packet. For example, ARQ 430 may service multiple packets (e.g., at block 620), and may use separate counters and separate timers for each packet in the packet window. ARQ 430 may detect (e.g., at block 625) which of the multiple packets were not received by the receiver (e.g., the packets in the packet window for which ARQ 430 did not receive an acknowledgement). In this implementation, process 600 may include returning to process block 605, and ARQ 430 may receive another packet and/or multiple packets (e.g., the next packets in queue) based on the packets in the packet window for which ARQ 430 did not receive an acknowledgement.

Figure 7:
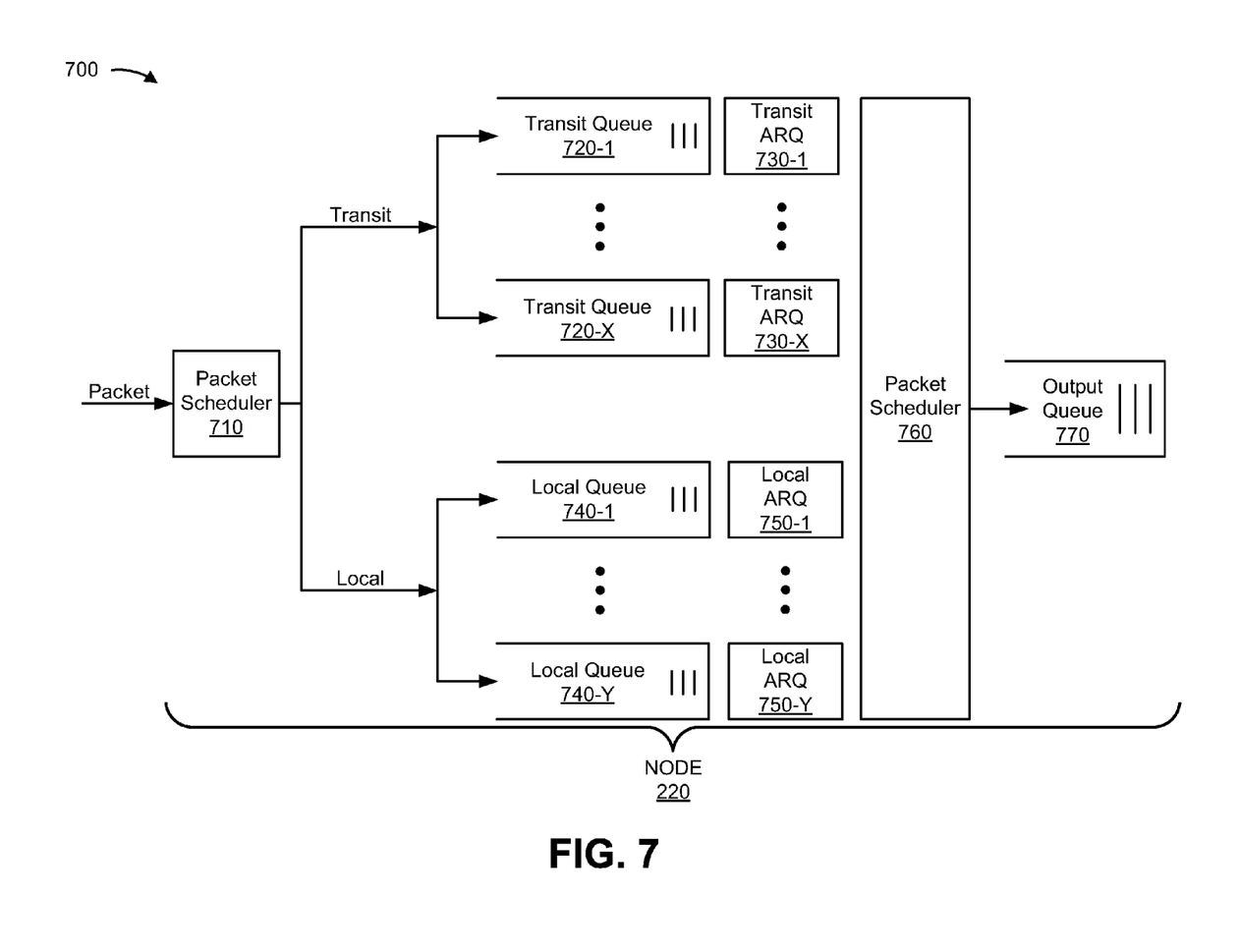
FIG. 7 is a diagram of an example implementation described herein.

FIG. 7 is a diagram of an example implementation 700 described herein. Assume that example implementation 700 occurs in node 220. However, in some implementations, example implementation 700 may occur in another device (e.g., base station 230).

As illustrated in FIG. 7, a packet may be received by node 220. Packet scheduler 710 (which may correspond to packet scheduler 420, FIG. 4) may service an incoming packet by identifying a packet characteristic and/or a traffic class associated with the packet. For example, packet scheduler 710 may identify a packet as having a local packet source or a transit packet source, as illustrated. Additionally, or alternatively, packet scheduler 710 may identify a packet based on a traffic class associated with the packet.

Packet scheduler 710 may store information associated with a packet having a transit packet source in a corresponding transit queue 720-1 through 720-X (X≥1) (hereinafter referred to collectively as "transit queues 720," and individually as "transit queue 720"), based on a traffic class associated with the packet. For example, packet scheduler 710 may store information associated with a transit packet, associated with a first traffic class, in transit queue 720-1. Similarly, packet scheduler 710 may store information associated with a transit packet, associated with a second traffic class, in transit queue 720-2.

A transit queue 720 may be serviced by a corresponding transit ARQ 730-1 through 730-X (X≥1) (hereinafter referred to collectively as "transit ARQs 730," and individually as "transit ARQ 730"). Each of transit queues 720 may correspond to ARQ 430 (FIG. 4). Each transit queue 720 may be serviced by a different transit ARQ 730. Each transit ARQ 730 may apply an ARQ algorithm to a packet in transit queue 720. The ARQ algorithm applied by transit ARQ 730 may be different for each transit queue 720. For example, transit ARQ 730 may use different values for $C_{max}$ and/or $T_{max}$ based on the corresponding transit queue 720 that transit ARQ 730 is servicing.

For example, packets stored in transit queue 720-1 may be associated with a communication that is not re-transmitted (e.g., a connectionless protocol communication, a voice conversation, etc.). In this example, transit ARQ 730-1 may set $C_{max}$ to zero so that the packets stored in transit queue 720-1 are not re-transmitted (e.g., they are only transmitted once). Alternatively, transit queue 720-1 may not be associated with a transit ARQ 730.

As another example, packets stored in transit queue 720-2 may be associated with a low data integrity communication (e.g., a communication that can tolerate some packet loss, such as broadcast content). In this example, transit ARQ 730-2 may set $C_{max}$ to one so that the packets stored in transit queue 720-2 are re-transmitted once if the initial transmission is not acknowledged.

As another example, packets stored in transit queue 720-3 may be associated with a high data integrity communication (e.g., a communication that cannot tolerate packet loss, such as e-mail, web browsing, file transfer protocol, "best efforts" communications, etc.). In this example, transit ARQ 730-3 may set $C_{max}$ to five so that the packets stored in transit queue 720-2 are re-transmitted five times if the initial transmission and each re-transmission is not acknowledged.

Packet scheduler 710 may store information associated with a packet having a local packet source in a corresponding local queue 740-1 through 740-Y (Y≥1) (hereinafter referred to collectively as "local queues 740," and individually as "local queue 740"), based on a traffic class associated with the packet. For example, packet scheduler 710 may store information associated with a local packet, having a first traffic class, in local queue 740-1. Similarly, packet scheduler 710 may store information associated with a local packet, having a second traffic class, in local queue 740-2. In some implementations, the quantity of transit queues (X) may be the same as the quantity of local queues (Y). Alternatively, the quantity of transit queues (X) may be different than the quantity of local queues (Y).

A local queue 740 may be serviced by a corresponding local ARQ 750-1 through 750-Y (Y≥1) (hereinafter referred to collectively as "local ARQs 750," and individually as "local ARQ 750"). Each local ARQ 750 may correspond to ARQ 430 (FIG. 4). Each local queue 740 may be serviced by a different local ARQ 750. Each local ARQ 750 may apply an ARQ algorithm to a packet in local queue 740. The ARQ algorithm applied by local ARQ 750 may be different for each local queue 740. For example, local ARQ 750 may use different values for $C_{max}$ and/or $T_{max}$ based on the local queue 740 that local ARQ 750 is servicing.

Packet scheduler 760 (which may correspond to packet scheduler 420, FIG. 4) may service transit queues 720 and/or local queues 740. Additionally, or alternatively, packet scheduler 760 may assist transit ARQs 730 in servicing transit queues 720, and/or may assist local ARQs 750 in servicing local queues 740. For example, packet scheduler 760 may determine a quantity of packets to service, an order (e.g., a sequence) of queues to service, and/or an algorithm to use for servicing queues, when servicing transit queues 720 and/or local queues 740.

Packet scheduler 760 may service a packet from transit queue 720 and/or local queue 740, and may store information associated with the packet in an output queue 770. In some implementations, output queue 770 may output packets and/or information associated with packets based on a work scheduling algorithm (e.g., first-in, first-out). Output queue 770 may output a packet and/or information associated with a packet to a device associated with the packet (e.g., user device 210 and/or node 220).

Implementations described herein may enable packets to be more efficiently processed. This may be achieved by using different ARQs and/or different ARQ algorithms to service different packets, based on characteristics associated with the packets.

The foregoing disclosure provides illustration and description, but is not intended to be exhaustive or to limit the embodiments to the precise form disclosed. Modifications and variations are possible in light of the above disclosure or may be acquired from practice of the embodiments.

Certain implementations are described herein with reference to packets. However, implementations described herein may be applied to any communications, such as formatted data units, bytes, characters, and/or bits. Furthermore, certain implementations have been described as storing, placing, and/or queuing packets in a queue. However, implementations described herein may store, place, and/or queue a packet and/or information associated with a packet (e.g., information identifying a packet) in a queue.

While a series of blocks have been described with regard to FIGS. 5 and 6, the order of the blocks may be modified in some implementations. Further, non-dependent blocks may be performed in parallel.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive a packet;
   identify a first packet characteristic associated with the packet, the first packet characteristic indicating a source from which the packet is received,
   the first packet characteristic indicating that the source is a first source when the packet is received from a user device without being relayed via a node device, and
   the first packet characteristic indicating that the source is a second source when the packet is received from the node device;
   identify a second packet characteristic associated with the packet;
   store information associated with the packet in a queue based on the first packet characteristic and the second packet characteristic,
   service the packet from the queue based on an automatic repeat requester ("ARQ") mechanism,
   the ARQ mechanism being based on the source from which the packet is received being the first source or the second source, indicated by the first packet characteristic, and being based on the second packet characteristic,
   the ARQ mechanism specifying a maximum quantity of times that the packet should be serviced before being dropped when a packet acknowledgement is not received,
   the ARQ mechanism specifying a time period between packet service attempts.

2. The device of claim 1, where the second packet characteristic comprises at least one of:
   an application type associated with the packet,
   a priority associated with the packet, or
   an error characteristic associated with the packet.

3. The device of claim 1, where the specified time period between packet service attempts is based on the first packet characteristic and the second packet characteristic.

4. The device of claim 1, where the maximum quantity of times that the packet should be serviced is based on the first packet characteristic and the second packet characteristic.

5. The device of claim 1, where the one or more processors are further to:
   receive information associated with a plurality of dropped packets; and
   specify the time period between packet service attempts or the maximum quantity of times that the packet should be serviced based on the received information associated with the plurality of dropped packets.

6. The device of claim 5, where the received information comprises an error characteristic, and where the one or more processors are further to:
   compare the error characteristic to a threshold; and
   specify the time period between packet service attempts or the maximum quantity of times that the packet should be serviced based on the error characteristic meeting or exceeding the threshold.

7. The device of claim 1, where the second packet characteristic indicates a destination to which the device is to send the packet,
   where the second packet characteristic indicates that the destination is a first destination when the packet is to be sent to a destination user device without being relayed to an intermediate node device,
   where the second packet characteristic indicates that the destination is a second destination when the packet is to be relayed to the intermediate node device, and
   where the ARQ mechanism is based on the destination being the first destination or the second destination.

8. A non-transitory computer-readable medium that stores instructions, the instructions comprising:
   one or more instructions that, when executed by one or more processors, cause the one or more processors to:
   receive a packet;
   identify a first packet characteristic associated with the packet, the first packet characteristic indicating a source from which the packet is received,
   the first packet characteristic indicating that the source is a first source when the packet is received from a user device without being relayed via a node device, and
   the first packet characteristic indicating that the source is a second source when the packet is received from the node device;
   identify a second packet characteristic associated with the packet, where the second packet characteristic is different from the first packet characteristic;
   store information associated with the packet in a queue based on the first packet characteristic and the second packet characteristic; and
   service the packet from the queue based on an automatic repeat requester ("ARQ") mechanism, the ARQ mechanism being based on the source from which the packet is received being the first source or the second source, indicated by the first packet characteristic, and being based on the second packet characteristic,
   the ARQ mechanism specifying a maximum quantity of times that the packet should be serviced before being dropped when a packet acknowledgement is not received,
   the ARQ mechanism specifying a time period between packet service attempts.

9. The non-transitory computer-readable medium of claim 8, where the second packet characteristic comprises at least one of:
   an application type associated with the packet,
   a priority associated with the packet, or
   an error characteristic associated with the packet.

10. The non-transitory computer-readable medium of claim 8, where the specified time period between packet service attempts is based on the first packet characteristic and the second packet characteristic.

11. The non-transitory computer-readable medium of claim 8, where the maximum quantity of times that the packet should be serviced is based on the first characteristic and the second packet characteristic.

12. The non-transitory computer-readable medium of claim 8, further comprising:
   one or more instructions that, when executed by the one or more processors, cause the one or more processors to:
   receive information associated with a plurality of dropped packets; and
   specify the time period between packet service attempts or the maximum quantity of times that the packet should be serviced based on the received information associated with the plurality of dropped packets.

13. The non-transitory computer-readable medium of claim 12, where the stored information comprises an error characteristic, and where the instructions further comprise:
   one or more instructions that, when executed by the one or more processors, cause the one or more processors to:
   compare the error characteristic to a threshold; and
   specify the time period between packet service attempts or the maximum quantity of times that the packet should be serviced based on the error characteristic meeting or exceeding the threshold.

14. The non-transitory computer-readable medium of claim 8, where the second packet characteristic indicates a destination to which to send the packet,
   where the second packet characteristic indicates that the destination is a first destination when the packet is to be sent to a destination user device without being relayed to an intermediate node device,
   where the second packet characteristic indicates that the destination is a second destination when the packet is to be relayed to the intermediate node device, and
   where the ARQ mechanism is based on the destination being the first destination or the second destination.

15. A method, comprising:
   receiving, by a device, a packet;
   identifying, by the device, a first packet characteristic associated with the packet,
   the first packet characteristic indicating a source from which the packet is received,
   the first packet characteristic indicating that the source is a first source when the packet is received from a user device without being relayed via a node device, and
   the first packet characteristic indicating that the source is a second source when the packet is received from the node device;
   identifying, by the device, a second packet characteristic associated with the packet;
   classifying, by the device, the packet into a traffic class based on the source from which the packet is received being the first source or the second source, indicated by the first packet characteristic, and being based on the second packet characteristic;
   storing, by the device, information associated with the packet in a queue based on the traffic class; and
   servicing, by the device, the packet from the queue based on an automatic repeat requester ("ARQ") mechanism, the ARQ mechanism being based on the traffic class, the ARQ mechanism specifying a maximum quantity of times that the packet should be serviced before being dropped when a packet acknowledgement is not received, the ARQ mechanism specifying a time period between packet service attempts.

16. The method of claim 15, where the second packet characteristic comprises at least one of:

an application type associated with the packet, a priority associated with the packet, or an error characteristic associated with the packet.

17. The method of claim 15, where the specified time period between packet service attempts is based on the traffic class.

18. The method of claim 15, where the maximum quantity of times that the packet should be serviced is based on the traffic class.

19. The method of claim 15, further comprising:

determining an error characteristic associated with a plurality of dropped packets;

comparing the error characteristic to a threshold; and specifying the time period between packet service attempts or the maximum quantity of times that the packet should be serviced based on the error characteristic meeting or exceeding the threshold.

20. The method of claim 15, where the second packet characteristic indicates a destination to which the device is to send the packet, where the second packet characteristic indicates that the destination is a first destination when the packet is to be sent to a destination user device without being relayed to an intermediate node device, where the second packet characteristic indicates that the destination is a second destination when the packet is to be relayed to the intermediate node device, and where classifying the packet includes classifying the packet into the traffic class based on the destination being the first destination or the second destination.

* * * * *